US010536214B2

(12) United States Patent
Wu et al.

(10) Patent No.: US 10,536,214 B2
(45) Date of Patent: Jan. 14, 2020

(54) MOBILE NETWORKING METHOD AND SYSTEM FOR MINIMIZING INTERFERENCE

(71) Applicant: SHENZHEN UNIVERSITY, Guangdong (CN)

(72) Inventors: Kaishun Wu, Guangdong (CN); Lu Wang, Guangdong (CN); Hailiang Yang, Guangdong (CN); Yongpan Zou, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 15/764,886

(22) PCT Filed: May 12, 2017

(86) PCT No.: PCT/CN2017/084238
§ 371 (c)(1),
(2) Date: Mar. 30, 2018

(87) PCT Pub. No.: WO2018/171025
PCT Pub. Date: Sep. 27, 2018

(65) Prior Publication Data
US 2019/0058523 A1 Feb. 21, 2019

(30) Foreign Application Priority Data

Mar. 21, 2017 (CN) .......................... 2017 1 0172677

(51) Int. Cl.
*H04B 7/185* (2006.01)
*H04B 17/318* (2015.01)
(Continued)

(52) U.S. Cl.
CPC ....... *H04B 7/18504* (2013.01); *H04B 7/0617* (2013.01); *H04B 15/00* (2013.01);
(Continued)

(58) Field of Classification Search
CPC ................. H04B 7/0617; H04B 7/086; H04B 7/185–18506; H04B 15/00;
(Continued)

(56) References Cited

FOREIGN PATENT DOCUMENTS

| CN | 101924586 | 12/2010 |
|---|---|---|
| CN | 103634034 | 3/2014 |

(Continued)

OTHER PUBLICATIONS

"Cellular-Connected UAV: Potentials, Challenges and Promising Technologies", Zeng et al., arXiv:1804-02217 v1 (Year: 2018).*
(Continued)

*Primary Examiner* — Raymond S Dean
(74) *Attorney, Agent, or Firm* — JCIPRNET

(57) ABSTRACT

The invention provides a mobile networking method and system for minimizing interference. The mobile networking method comprises the following steps: unmanned aerial vehicles establish connection and communication with ground base stations through a wireless relay method; connection and communication between the unmanned aerial vehicles are established through a wireless self-networking method; multiple unmanned aerial vehicles cooperate to form a cellular network to provide wireless network services for users; the unmanned aerial vehicles receive a received signal strength indicator fed back by an user equipment and measure an angle of arrival of a signal beam from the user equipment; the main lobe of a signal is made to aim at the direction of arrival of service users through a mobile interference alignment method and a beam forming method thus enabling the optimal hovering position of the unmanned aerial vehicle to be obtained.

5 Claims, 3 Drawing Sheets

(51) Int. Cl.
  *H04B 7/06* (2006.01)
  *H04B 15/00* (2006.01)
  H04W 84/04 (2009.01)
  H04W 84/18 (2009.01)

(52) U.S. Cl.
  CPC ......... *H04B 17/318* (2015.01); *H04W 84/042* (2013.01); *H04W 84/18* (2013.01)

(58) Field of Classification Search
  CPC .... H04B 17/318; H04W 84/06; H04W 84/18; H04W 84/042
  See application file for complete search history.

(56) References Cited

FOREIGN PATENT DOCUMENTS

| | | |
|---|---|---|
| CN | 106330283 | 1/2017 |
| WO | 2013051969 | 4/2013 |

OTHER PUBLICATIONS

"The Sky Is Not the Limit: LTE for Unmanned Aerial Vehicles", Lin et al., IEEE Communications Magazine (Year: 2018).*

* cited by examiner

MOBILE NETWORKING METHOD AND SYSTEM FOR MINIMIZING INTERFERENCE

CROSS-REFERENCE TO RELATED APPLICATION

This application is a 371 application of the international PCT application serial no. PCT/CN2017/084238, filed on May 12, 2017, which claims the priority benefit of China application no. 201710172677.7, filed on Mar. 21, 2017. The entirety of each of the above-mentioned patent applications is hereby incorporated by reference herein and made a part of this specification.

BACKGROUND

Technical Field

The invention relates to the technical field of wireless communications, and particularly relates to a mobile networking method and system for minimizing interference.

Description of Related Art

With the continuous development of the wireless communication technique, more and more wireless network devices are used, and accordingly, the number of wireless access points is increased. In 3G and 4G, the cell coverage becomes smaller, the number of base stations is increased, and consequentially, the cell edges become blurred; and meanwhile, severe inter-cell interference is inevitably caused by high frequency spectrum multiplexing coefficients. Wireless network service providers devote to creating an approach which can reduce interference while ensuring effective service area coverage so as to provide high-quality communication services. According to existing networking methods, base stations in a cell are generally located at fixed positions, interference is worsened while the number of users in the cell is increased, and consequentially, the user communication quality in the cell is reduced.

Traditional networking methods all have the problem of severe interference under high user density conditions, and immobile base stations.

SUMMARY OF THE INVENTION

The invention provides a mobile networking method for minimizing interference. The mobile networking method for minimizing interference comprises the following steps:

S1: unmanned aerial vehicles establish connection and communication with ground base stations through a wireless relay method;

S2: connection and communication between the unmanned aerial vehicles are established through a wireless self-networking method;

S3: multiple unmanned aerial vehicles cooperate to form a cellular network to provide wireless network services for users;

S4: the unmanned aerial vehicles receive a received signal strength indicator fed back by an user equipment and measure an angle of arrival of a signal beam from the user equipment;

S5: the unmanned aerial vehicles share the measurement information obtained in step S4, the main lobe of a desired signal, which is a cellular network signal for service users of a specific unmanned aerial vehicle, is made to aim at the direction of arrival of the service users and a null is made to aim at the direction of arrival of the interference signals, which are cellular network signals of other unmanned aerial vehicles, through a mobile interference alignment method and a beam forming method thus enabling the optimal hovering position of the unmanned aerial vehicle to be obtained;

S6: when a position of the user equipment changes, step S4 and step S5 are repeated to obtain the optimal hovering position again.

As a further improvement of the invention, in step S1, the unmanned aerial vehicles establish connection and communication with the ground base stations through the wireless relay method, and a link frequency is different from a communication frequency between sub-base stations and the users.

As a further improvement of the invention, in step S3, the unmanned aerial vehicles cooperate and determine flight of the unmanned aerial vehicles through a distributed control method, each unmanned aerial vehicle covers a certain area and provides the wireless network services for the users in the area, and all the unmanned aerial vehicles form the mobile cellular network.

As a further improvement of the invention, step S4 comprises:

S41: the user equipment monitors signal intensities of the unmanned aerial vehicles and feeds the information back to the unmanned aerial vehicles;

S42: the unmanned aerial vehicles receive signals from the service users, and the direction of arrival of the user equipment is estimated through a multiple signal classification (MUSIC) algorithm.

As a further improvement of the invention, step S5 comprises:

S51: the unmanned aerial vehicles share the information obtained in step S4 through the self network;

S52: based on the mobile interference alignment method, each unmanned aerial vehicle obtains a position where interference from the cellular network signals of other unmanned aerial vehicles is minimized through a random hill climbing algorithm;

S53: the main lobe of the desired signal of each unmanned aerial vehicle is made to aim at the corresponding service users through the beam forming technique, and thus reducing interference to other user equipment;

S54: the optimal hovering position is obtained based on step S52 and step S53.

The invention further provides a mobile networking system for minimizing interference. The mobile networking system for minimizing interference comprises:

a signal acquisition module, wherein unmanned aerial vehicles are equipped with multiple antennas and acquire signals from user equipment as well as channel state information (CSI);

a signal analysis module, wherein the signal analysis module is used for determining the direction of arrival of the user equipment through the MUSIC algorithm;

a signal processing module, wherein the signal processing module achieves beam forming through precoding according to known signal state information;

a position searching module, wherein the position searching module is used for assisting each unmanned aerial vehicle in obtaining a hovering position where interference to other unmanned aerial vehicles is small through a random hill climbing algorithm.

As a further improvement of the invention, the signal acquisition module comprises:

an acquisition module, wherein noise and out-of-band interference signals are filtered out through a band-pass filter for wireless signals acquired by the unmanned aerial vehicles according to the operating frequency of the equipment, so that to-be-processed signals are obtained, and the channel state information of the physical layer is also obtained.

As a further improvement of the invention, the signal analysis module comprises:

a main path information extraction unit, wherein multi-path components arriving at a receiving antenna along different paths are separated by means of chromatic dispersion of a multi-path signal in the time domain and the power delay distribution characteristic, a power threshold value is set, the path signal, greater than the power threshold, of the user signal is regarded as main path information, and the main path information is transformed from the time domain to the frequency domain through fast Fourier transform;

an angle of arrival calculation unit, wherein according to phase deviation of the signal arriving at an antenna array, the time difference of arrival of the signal at different antennas can be worked out, and the angle of arrival $\theta$ of the user signal along the direct path is worked out through the MUSIC algorithm according to the different times of arrival of the signal at the antenna array.

As a further improvement of the invention, the signal processing module comprises:

a CSI processing unit, wherein the CSI processing unit is used for smoothing acquired CSI data so as to eliminate signal coherence;

a beam forming unit, wherein based on the smoothed CSI data, a forming matrix is calculated, the main lobe of the signal aims at the direction of arrival of the user signal, and the null aims at the direction of arrival of interference signals, so that the radiant power of the sub-base stations is reduced, and interference to other users is also reduced.

As a further improvement of the invention, the position searching module comprises:

a field distribution calculation unit, wherein for adjacent unmanned aerial vehicles, spatial distribution of wireless signals is estimated according to known position information and a standard propagation model of the wireless signals in the space;

a position searching unit, wherein through the random hill climbing algorithm, enabling each unmanned aerial vehicle obtains a position where the signal intensity of the adjacent unmanned aerial vehicle is weak and then hovers at the position.

The invention has the following beneficial effects: interference between adjacent cells is reduced through the mobility of the unmanned aerial vehicle sub-base stations, and existing wireless network equipment are mainly adopted and no professional equipment is needed, so that the mobile networking method for minimizing interference has extremely high universality.

DESCRIPTION OF THE EMBODIMENTS

Figure 1:
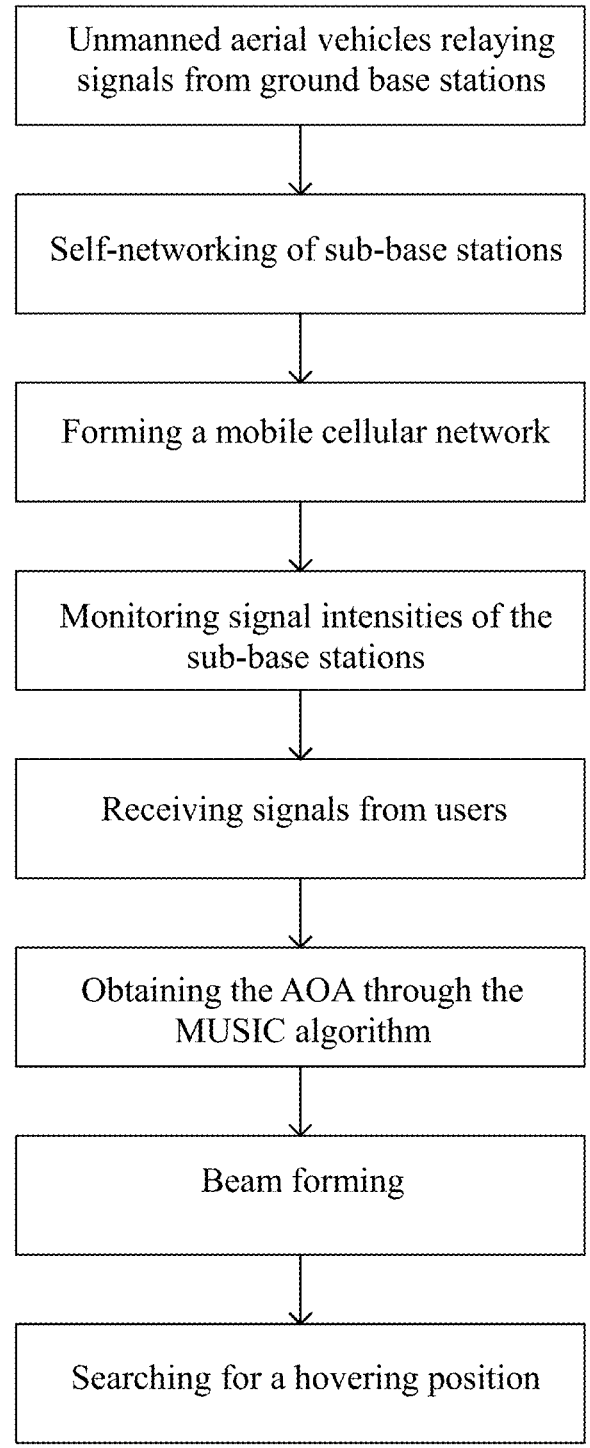
FIG. 1 is an implementation flow diagram of a mobile networking method of the invention.
Figure 2:
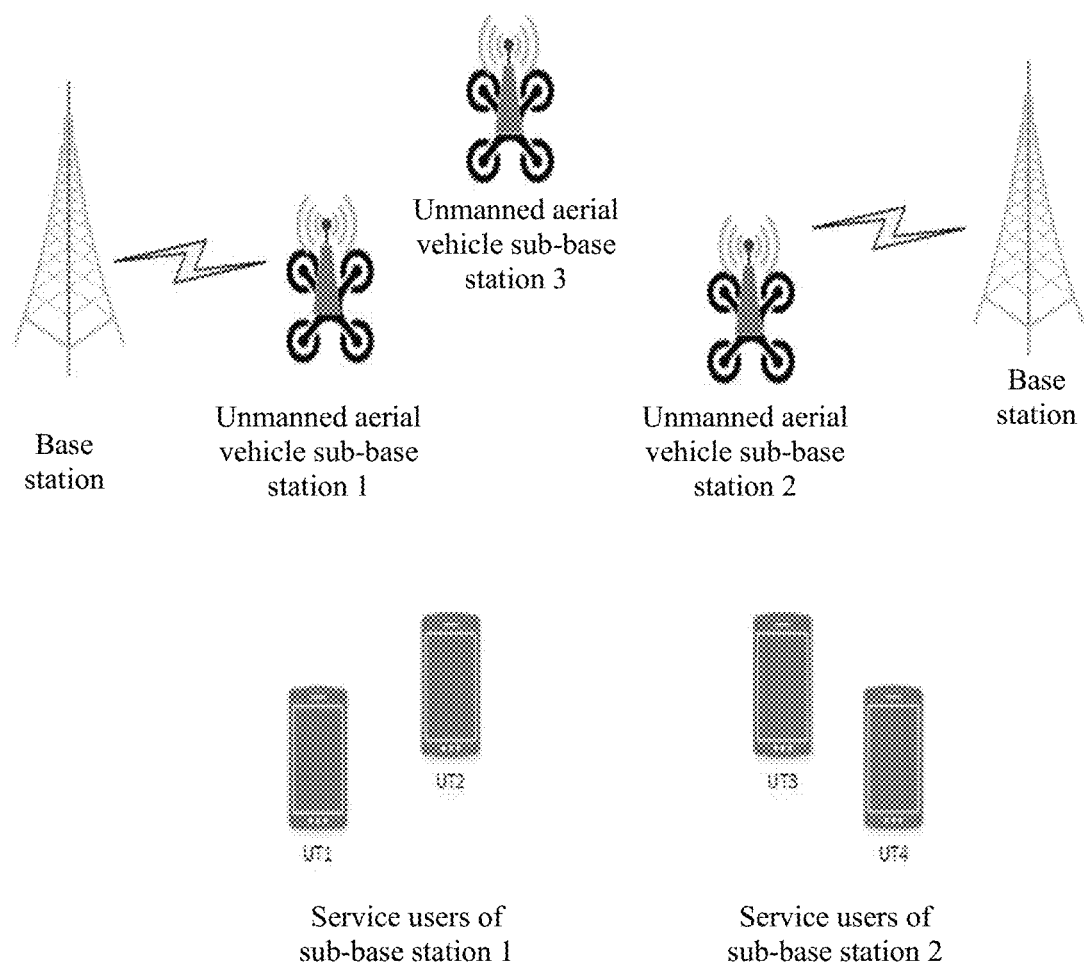
FIG. 2 is a location diagram for the mobile networking method of the invention.

The invention discloses a mobile networking method for minimizing interference. The mobile networking method for minimizing interference comprises the following steps:

S1: unmanned aerial vehicles establish connection and communication with ground base stations through a wireless relay method;

S2: connection and communication between the unmanned aerial vehicles are established through a wireless self-networking method;

S3: multiple unmanned aerial vehicles cooperate to form a cellular network to provide wireless network services for users;

S4: the unmanned aerial vehicles receive a received signal strength indicator (RSSI) fed back by an user equipment and measure an angle of arrival (AoA) of a signal beam from the user equipment;

S5: the unmanned aerial vehicles share the measurement information obtained in step S4, the main lobe of a desired signal, which is a cellular network signal for service users of a specific unmanned aerial vehicle, is made to aim at the direction of arrival of the service users and a null is made to aim at the direction of arrival of the interference signals, which are cellular network signals of other unmanned aerial vehicles, through a mobile interference alignment method and a beam forming method thus enabling the optimal hovering position of the unmanned aerial vehicle to be obtained;

S6: when a position of the user equipment changes, step S4 and step S5 are repeated to obtain the optimal hovering position again.

In actual application, multi-antenna transceivers are used for receiving wireless signals, and the sub-base stations are unmanned aerial vehicles. According to the fact that a specific unmanned aerial vehicle has different degrees of interference to other unmanned aerial vehicles when located at different positions, the mobile networking method is based on the mobility of the unmanned aerial vehicle, and interference to other users is reduced through the beam forming method. Severe interference can be generated between base stations operating at the same frequency, and interference of the same frequency cannot be filtered out by band-pass filters. To obtain the direction of arrival of the service users, the direct path component of a user signal needs to be separated out, and the angle of arrival of the beam is obtained through the multiple signal classification (MUSIC) algorithm. Through moving and beam forming, interference between the sub-base stations and interference to the users from the sub-base stations can be minimized.

Specifically, in step S1, the unmanned aerial vehicles serve as aerial sub-base stations and establish connection and communication with the ground base stations through the wireless relay method, and meanwhile, for avoiding new interference, a link frequency is different from a communication frequency between sub-base stations and the users.

When the system starts to operate, the unmanned aerial vehicle located on the network edge is connected to the nearest ground base station, and the frequency points of the uplink and the downlink are different from the frequency points of the cellular network.

In step S2, the sub-base stations are self-networked so as to be connected and communicated.

In step S3, the unmanned aerial vehicles cooperate, and determine flight of the unmanned aerial vehicles through a distributed control method. Each unmanned aerial vehicle covers a certain area and provides the wireless network services for the users in the area. All the unmanned aerial vehicles form the mobile cellular network.

In the outdoor environment, due to the existence of reflectors such as buildings and trees, signals reach the receiving terminal from the transmitting terminal along many paths, and the times of arrival and the angles of arrival of the signals transmitted along different paths are different. The degrees of attenuation of the signals transmitted along different paths are also different, and chromatic dispersion of the signals can be caused in the time domain. The signals transmitted along short paths reach the antenna array earlier, the signals transmitted along long paths reach the antenna array late, and thus the direct path component can be separated from non-direct path components through power delay distribution. A power threshold is preset, and the signal greater than the power threshold is regarded as the possible direct path component. The signal with short delay is regarded as the direct path component and is transformed to the frequency domain from the time domain through FFT so as to be input in the next step.

In step S4, the process of calculating the angle of arrival of user signals comprises:

S41: the user equipment monitors signal intensities of the unmanned aerial vehicles and feeds the information back to the unmanned aerial vehicles;

S42: the unmanned aerial vehicles receive the signals from the service users, and the direction of arrival of the user equipment is estimated through a multiple signal classification (MUSIC) algorithm.

In step S5, the process of searching for the minimum interference position comprises:

S51: the unmanned aerial vehicles share the information obtained in step S4 through the self network;

S52: based on the mobile interference alignment method, each unmanned aerial vehicle obtains a position where interference from the cellular network signals of other unmanned aerial vehicles is minimized through a random hill climbing algorithm;

S53: the main lobe of the desired signal of each unmanned aerial vehicle is made to aim at the corresponding service users through the beam forming technique, and thus reducing interference to other user equipment;

S54: the optimal hovering position is obtained based on step S52 and step S53.

Specifically, as is shown in FIG. 1, the process of locating an indoor interference source comprises the steps:

1) the unmanned aerial vehicles are connected to the ground base stations at a frequency point different from that of a terminal network;

2) the unmanned aerial vehicles are connected and communicated through the self-networking method;

3) a mobile cellular network formed by multiple unmanned aerial vehicles provides services for users;

4) user terminal equipment monitors the received signal intensity of the sub-base stations;

5) the sub-base stations acquire signals from user terminals;

6) the angle of arrival of the signals from the user terminals is obtained through the MUSIC algorithm;

7) the main lobe of the signal from the base stations is made to aim at the users through the beam forming technique according to the angle of arrival, and thus interference to users in other directions is reduced;

8) the unmanned aerial vehicles move and obtain the positions where interference to adjacent base stations is small according to the positions of the unmanned aerial vehicles.

The invention further discloses a mobile networking system for minimizing interference. The mobile networking system for minimizing interference comprises:

a signal acquisition module, wherein unmanned aerial vehicles are equipped with multiple antennas and acquire signals from user equipment as well as channel state information;

a signal analysis module, wherein the signal analysis module is used for determining the direction of arrival of the user equipment through the MUSIC algorithm;

a signal processing module, wherein the signal processing module achieves beam forming through precoding according to known signal state information;

a position searching module, wherein the position searching module is used for assisting each unmanned aerial vehicle in obtaining a hovering position where interference to other unmanned aerial vehicles is small through a random hill climbing algorithm.

The number of antennas of each unmanned aerial vehicle is two or more.

Figure 3:
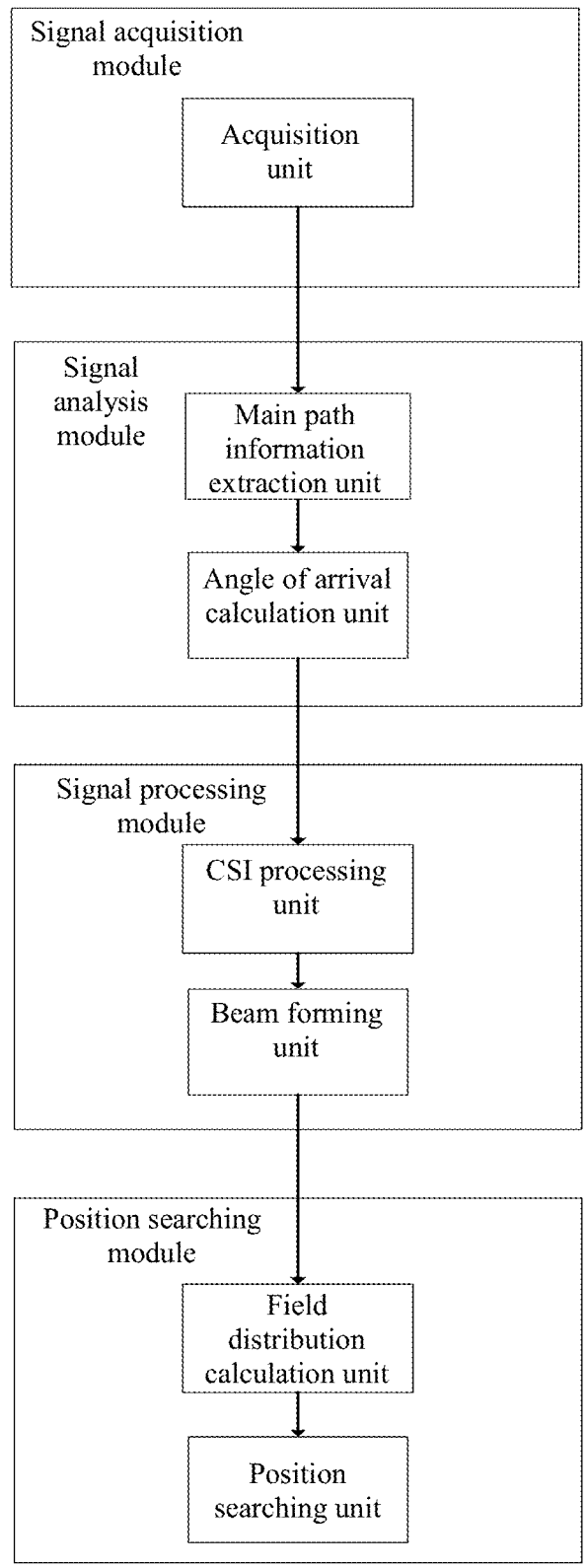
FIG. 3 is a framework diagram of a mobile networking system of the invention.

As is shown in FIG. 3, furthermore, the signal acquisition module comprises:

an acquisition module, wherein noise and out-of-band interference signals are filtered out through a band-pass filter for wireless signals acquired by the unmanned aerial vehicles according to the operating frequency of the equipment, so that to-be-processed signals are obtained, and the channel state information of the physical layer is also obtained.

Furthermore, the signal analysis module comprises:

a main path information extraction unit, wherein multi-path components arriving at a receiving antenna along different paths are separated by means of chromatic dispersion of a multi-path signal in the time domain and the power delay distribution characteristic, a power threshold value is set, the path signal, greater than the power threshold, of the user signal is regarded as main path information, and the main path information is transformed from the time domain to the frequency domain through fast Fourier transform (FFT);

an angle of arrival calculation unit, wherein according to phase deviation of the signal arriving at an antenna array, the time difference of arrival of the signal at different antennas can be worked out, and the angle of arrival θ of the user signal along the direct path is worked out through the MUSIC algorithm according to the different times of arrival of the signal at the antenna array.

Furthermore, the signal processing module comprises:

a CSI processing unit, wherein the CSI processing unit is used for smoothing acquired CSI data so as to eliminate signal coherence;

a beam forming unit, wherein based on the smoothed CSI data, a forming matrix is calculated, the main lobe of the signal aims at the direction of arrival of the user signal, and the null aims at the direction of arrival of interference signals, so that the radiant power of the sub-base stations is reduced, and interference to other users is also reduced.

Furthermore, the position searching module comprises:

a field distribution calculation unit, wherein for adjacent unmanned aerial vehicles, spatial distribution of wireless signals is estimated according to known position information and a standard propagation model of the wireless signals in the space;

a position searching unit, wherein through the random hill climbing algorithm, enabling each unmanned aerial vehicle obtains a position where the signal intensity of the adjacent unmanned aerial vehicle is weak and then hovers at the position.

The unmanned aerial vehicles have the advantages of being flexible, low in cost and the like. As the unmanned aerial vehicles are used as aerial sub-base stations, a service area can be well covered, the coverage area can be controlled based on the mobility of the unmanned aerial vehicles, and thus interference to the adjacent cell is reduced. With the development of the multiple-input-multiple-output (MIMO) technique, the interference management method such as beam forming can be used through multiple antennas.

Based on the mobility of the unmanned aerial vehicle sub-base stations, interference between adjacent cells is reduced. According to the invention, existing wireless network equipment is mainly used, no professional equipment is needed, and thus the mobile networking method for minimizing interference has extremely high universality.

The further detailed description of the invention is given with specific preferred embodiments above, but the specific embodiments of the invention are not limited to the description. Various simple deductions or substitute made by those ordinarily skilled in the field without deviating from the concept of the invention are all within the protection scope of the invention.

What is claimed is:

1. A mobile networking method for minimizing interference, comprising the following steps:
    S1: unmanned aerial vehicles establish connection and communication with ground base stations through a wireless relay method;
    S2: connection and communication between the unmanned aerial vehicles are established through a wireless self-networking method;
    S3: multiple unmanned aerial vehicles cooperate to form a cellular network to provide wireless network services for users;
    S4: the unmanned aerial vehicles receive a received signal strength indicator fed back by an user equipment and measure an angle of arrival of a signal beam from the user equipment;
    S5: the unmanned aerial vehicles share the measurement information obtained in step S4, the main lobe of a desired signal, which is a cellular network signal for service users of a specific unmanned aerial vehicle, is made to aim at the direction of arrival of the service users and a null is made to aim at the direction of arrival of the interference signals, which are cellular network signals of other unmanned aerial vehicles, through a mobile interference alignment method and a beam forming method thus enabling an optimal hovering position of the unmanned aerial vehicle to be obtained;
    S6: when a position of the user equipment changes, step S4 and step S5 are repeated to obtain the optimal hovering position again.

2. The mobile networking method according to claim 1, wherein in step S1, the unmanned aerial vehicles establish connection and communication with the ground base stations through the wireless relay method, and a link frequency is different from a communication frequency between sub-base stations and the users.

3. The mobile networking method according to claim 1, wherein in step S3, the unmanned aerial vehicles cooperate and determine flight of the unmanned aerial vehicles through a distributed control method, each unmanned aerial vehicle covers a certain area and provides the wireless network services for the users in the area, and all the unmanned aerial vehicles form the mobile cellular network.

4. The mobile networking method according to claim 1, wherein step S4 comprises:
    S41: the user equipment monitors signal intensities of the unmanned aerial vehicles and feeds the information back to the unmanned aerial vehicles;
    S42: the unmanned aerial vehicles receive signals from the service users, and the direction of arrival of the user equipment is estimated through a multiple signal classification (MUSIC) algorithm.

5. The mobile networking method according to claim 1, wherein step S5 comprises:
    S51: the unmanned aerial vehicles share the information obtained in step S4 through the self network;
    S52: based on the mobile interference alignment method, each unmanned aerial vehicle obtains a position where interference from the cellular network signals of other unmanned aerial vehicles is minimized through a random hill climbing algorithm;
    S53: the main lobe of the desired signal of each unmanned aerial vehicle is made to aim at the corresponding service users through the beam forming technique, and thus reducing interference to other user equipment;
    S54: the optimal hovering position is obtained based on step S52 and step S53.

* * * * *